US011295278B2

(12) United States Patent
Benton et al.

(10) Patent No.: US 11,295,278 B2
(45) Date of Patent: *Apr. 5, 2022

(54) PAYMENT INSTRUMENT VALIDATION AND PROCESSING

(71) Applicant: BANK OF AMERICA CORPORATION, Charlotte, NC (US)

(72) Inventors: James Kevin Benton, Matthews, NC (US); Mark David Felse, Indian Land, SC (US); Sarah Catherine Christine, Smyrna, GA (US); John Barrett Hall, Charlotte, NC (US); Michael J. Pepe, Jr., Wilmington, DE (US); Kerry Kurt Simpkins, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 257 days.

This patent is subject to a terminal disclaimer.

(21) Appl. No.: 16/170,861

(22) Filed: Oct. 25, 2018

(65) Prior Publication Data
US 2019/0172022 A1 Jun. 6, 2019

Related U.S. Application Data

(63) Continuation of application No. 14/473,421, filed on Aug. 29, 2014, now Pat. No. 10,140,597.

(51) Int. Cl.
G06Q 20/00 (2012.01)
G06Q 20/04 (2012.01)
(Continued)

(52) U.S. Cl.
CPC ......... *G06Q 20/042* (2013.01); *G06K 9/6201* (2013.01); *G06Q 20/027* (2013.01);
(Continued)

(58) Field of Classification Search
None
See application file for complete search history.

(56) References Cited

U.S. PATENT DOCUMENTS 4,205,780 A 6/1980 Burns et al.
4,685,141 A 8/1987 Hoque et al.
(Continued)

FOREIGN PATENT DOCUMENTS

WO 2013163092 A1 10/2013
WO WO 2013/163092 * 10/2013 ............. G06Q 20/40

OTHER PUBLICATIONS

"Top Image Systems Streamlines Remittance Processing with MobiREMIT" published Mar. 13, 2014 by Telecomworldwire Normans Media Ltd (Year: 2014).*

(Continued)

*Primary Examiner* — Alexander G Kalinowski
*Assistant Examiner* — Blane A Lickteig
(74) *Attorney, Agent, or Firm* — Moore & Van Allen PLLC; Jeffrey R. Gray

(57) ABSTRACT

Embodiments of the present invention provide apparatuses and methods that help validate and process payment instruments for different products, such as but not limited to credit card payments, mortgage payments, or any other type of payment. The payment amount from a payment instrument may be determined from a multiple locations on the payment instrument. In addition, a payment amount may be determined from a remittance document that accompanies the payment instrument, such as a remittance coupon that is mailed along with a check. The amount in the remittance courtesy box, the minimum amount due, the last payment made, and the full balance remaining may all be captured and used to validate the amount on the payment instrument. Moreover, one or more confidence scores for the amounts on (Continued)

the payment instrument and remittance document may be used to validate the payment amount.

20 Claims, 6 Drawing Sheets

(51) Int. Cl.
| | |
|---|---|
| *G06Q 20/14* | (2012.01) |
| *G06Q 20/40* | (2012.01) |
| *G06K 9/62* | (2022.01) |
| *G06V 10/98* | (2022.01) |
| *G06V 30/413* | (2022.01) |
| *G06V 30/416* | (2022.01) |
| *G06V 30/224* | (2022.01) |
| *G06Q 20/02* | (2012.01) |
| *G06Q 20/10* | (2012.01) |

(52) U.S. Cl.
CPC .......... *G06Q 20/102* (2013.01); *G06Q 20/14* (2013.01); *G06Q 20/40* (2013.01); *G06Q 20/4016* (2013.01); *G06V 10/993* (2022.01); *G06V 30/2253* (2022.01); *G06V 30/413* (2022.01); *G06V 30/416* (2022.01)

(56) References Cited

U.S. PATENT DOCUMENTS

| | | | |
|---|---|---|---|
| 4,813,077 A | 3/1989 | Woods et al. | |
| 4,876,731 A | 10/1989 | Loris et al. | |
| 5,146,512 A | 9/1992 | Weideman et al. | |
| 5,191,525 A | 3/1993 | LeBrun et al. | |
| 5,193,121 A | 3/1993 | Elischer et al. | |
| 5,237,158 A | 8/1993 | Kern et al. | |
| 5,253,307 A | 10/1993 | Wayner et al. | |
| 5,321,238 A | 6/1994 | Kamata et al. | |
| 5,359,667 A | 10/1994 | Borowski et al. | |
| 5,488,671 A | 1/1996 | Kern | |
| 5,689,579 A | 11/1997 | Josephson | |
| 5,842,577 A | 12/1998 | Stevens et al. | |
| 5,894,525 A | 4/1999 | Nohl et al. | |
| 5,897,625 A | 4/1999 | Gustin et al. | |
| 5,926,392 A | 7/1999 | York et al. | |
| 6,055,327 A * | 4/2000 | Aragon | G06K 9/033 382/138 |
| 6,073,121 A | 6/2000 | Ramzy | |
| 6,112,902 A | 9/2000 | Hayduchok et al. | |
| 6,196,393 B1 | 3/2001 | Kruk, Jr. et al. | |
| 6,547,078 B1 | 4/2003 | Lile et al. | |
| 6,668,074 B1 | 12/2003 | Wilson | |
| 6,808,109 B2 | 10/2004 | Page | |
| 6,816,608 B2 | 11/2004 | Cato | |
| 7,267,264 B2 | 9/2007 | Page | |
| 7,461,775 B2 | 12/2008 | Swift et al. | |
| 7,475,807 B2 | 1/2009 | Halpin et al. | |
| 7,494,052 B1 | 2/2009 | Carpenter et al. | |
| 2001/0047331 A1 * | 11/2001 | Malanga | G06Q 20/04 705/40 |
| 2007/0136198 A1 | 6/2007 | Foth et al. | |
| 2007/0205262 A1 | 9/2007 | Bates | |
| 2008/0243561 A1 | 10/2008 | Deygout et al. | |
| 2009/0094148 A1 | 4/2009 | Gilder et al. | |
| 2009/0112756 A1 * | 4/2009 | Haselden | G06Q 10/10 705/39 |

OTHER PUBLICATIONS

"Top Image Systems Streamlines Remittance Processing with MobiREMIT" published Mar. 13, 2014 by Teleconnworldwire Normans Media Ltd.

* cited by examiner

PAYMENT INSTRUMENT VALIDATION AND PROCESSING

FIELD

This invention relates generally to the field of systems and methods for validating and processing payment instruments, and more particularly embodiments of the invention relate to verifying the payment amounts associated with the payments in order to electronically process the payments to reduce failed readings and manage the processing flows associated with the payments.

BACKGROUND

Processing of checks includes taking an image of a check and determining the payment amount from the image. However, the payment amount determined from the image of the check may be incorrect for a number of reasons.

BRIEF SUMMARY

Embodiments of the present invention address the above needs and/or achieve other advantages by providing apparatuses (e.g., a system, computer program product, and/or other device) and methods that help validate and process payment instruments for different products (e.g. goods and services), such as but not limited to credit card payments. In other embodiments of the invention, the payment may be for a home loan payment, which may comprise a payment for first mortgage, second mortgage, HELOC, assessments due, homeowner's association dues, principal amount, interest amount, escrow amount for taxes, escrow amount for insurance, or the like. In other embodiments of the invention the payment may be for any type of good or service. Regardless of what the payment is for, the payment instrument final amount determined from a payment instrument may be identified from multiple locations on the payment instrument. For example, with respect to a check payment, the payment amount may be determined from the numbers in the check courtesy box, the legal amount spelled out in words in the legal payment area, and/or in the memo line of the check. In addition, the payment instrument final amount may be determined from a remittance document that accompanies the payment instrument, such as a remittance coupon that is mailed along with a check. The amounts in the remittance courtesy box, the minimum amount due (e.g., min pay), the last payment made (e.g., last pay), and the full balance remaining (e.g. full pay) may all be captured from the remittance document. In other embodiments this information may be stored by the institution requesting payment (e.g., a financial institution, or other entity that sends payment notifications to customers) and captured as needed for each payment. One or more confidence scores for the amounts captured from the payment instrument or the remittance document may be determined based on the quality of the images, the handwritten amounts, the typed amounts, or the like. The confidence score may be based on the quality of the image captured of the instrument (e.g., the device and software used to scan and read the paper copy), the handwriting or typeface used in the instrument, the located of the text within areas expected in the instrument, or the like. The better the image is, the clearer the handwriting or text is, and the more information in the image that is found in the proper areas of the instrument all generally result in better confidence scores (e.g., higher scores).

The amounts identified on the payment instrument (e.g., check, or the like) and remittance documents (e.g., remittance coupon, or the like) described above may be cross-checked with each other electronically in order to validate the correct amount for the payment and/or to determine how to route the payment for processing. Moreover, the one or more confidence scores for one or more amounts identified may also be utilized in order to validate the correct amount for the payment and/or to determine how to route the payment for processing. As such, the amounts listed in the fields of the payment instrument and/or remittance documents (or otherwise stored by the institution), the combination of the fields within these documents, and/or the confidence scores that indicate how accurate the amounts in the fields may be, may play a part in determining how each of the payments are routed for validation and posting to customer accounts.

Embodiments of the invention comprise system, computer program product, and methods claims for providing validation and processing of a plurality of payments using a plurality of payment instruments and a plurality of remittance documents. One embodiment of the invention comprises identifying a payment instrument final amount for each of the plurality of payment instruments based on an image of each of the plurality of payment instruments. The invention further comprises identifying at least one amount from each of the plurality of remittance documents associated with each of the plurality of payment instruments, wherein the at least one amount from each of the plurality of remittance documents comprises a remittance courtesy amount, a remittance full payment amount, a remittance minimum payment amount, or a remittance last payment amount. The invention also comprises identifying a payment instrument final amount confidence score. The invention further comprises routing the plurality of payments for verification or posting based on the payment instrument final amount of each of the plurality of payments, the at least one amount from each of the plurality of remittance documents associated with each of the plurality of payment instruments, and the payment instrument final amount confidence score.

In further accord with an embodiment of the invention, the payment instrument final amount is determined from a courtesy box amount and a legal line amount on the payment instrument.

In another embodiment of the invention, a payment from the plurality of payments is routed for verification when the payment instrument final amount does not equal any one of the remittance courtesy amount, the remittance full payment amount, the remittance minimum payment amount, or the remittance last payment amount.

In still another embodiment of the invention, when the payment instrument final amount of a payment is equal to the remittance courtesy amount the payment is routed for verification when the payment instrument final confidence score for the payment is less than a first threshold payment instrument final confidence score and the payment is routed for posting when the payment instrument final confidence score for the payment is greater than a second threshold payment instrument final confidence score. Moreover, the payment is routed based on a remittance courtesy confidence score when the payment instrument final confidence score for the payment is greater than the first threshold but less than the second threshold, such that the payment is routed for posting when the remittance courtesy confidence score is greater than a remittance courtesy confidence score threshold, and the payment is routed for verification when the remittance courtesy confidence score is less than the remittance courtesy confidence score threshold.

In yet another embodiment of the invention, when the payment instrument final amount of a payment is equal to the remittance full payment amount the payment is routed for posting when the payment instrument final confidence score for the payment is greater than a threshold payment instrument final confidence score. Alternatively, the payment is routed based on a remittance full payment confidence score when the payment instrument final confidence score for the payment is less than the threshold payment instrument confidence score, such that the payment is routed for posting when the remittance full payment confidence score is greater than a remittance full payment confidence score threshold, and the payment is routed for verification when the remittance full payment confidence score is less than the remittance full payment confidence score threshold.

In further accord with an embodiment of the invention, when the payment instrument final amount of a payment is equal to the remittance minimum payment amount the payment is routed for verification when the payment instrument final confidence score for the payment is less than a threshold payment instrument final confidence score, and the payment is routed for posting when the payment instrument final confidence score for the payment is greater than the threshold payment instrument final confidence score.

In another embodiment of the invention when the payment instrument final amount of a payment is equal to the remittance last payment amount, the payment is routed for verification when the payment instrument final confidence score for the payment is less than a threshold payment instrument final confidence score, and the payment is routed for posting when the payment instrument final confidence score for the payment is greater than the threshold payment instrument final confidence score.

In still another embodiment of the invention, when a payment from the plurality of payments is routed to validation, the invention further comprises receiving a keyed value, determining when the keyed value is equal to the payment instrument final amount, determining the payment instrument final amount confidence score, routing the payment to posting when the payment instrument final amount confidence score is greater than a threshold value, and routing the payment for escalation when the payment instrument final amount confidence score is less than the threshold value.

In yet another embodiment of the invention, when a payment from the plurality of payments is routed to validation, the invention further comprises receiving a keyed value, determining when the keyed value is not equal to the payment instrument final amount, and determining when the keyed value is equal to the remittance full payment amount and route the payment to posting.

In further accord with an embodiment of the invention, when a payment from the plurality of payments is routed to validation, the invention further comprises receiving a keyed value, determining when the keyed value is not equal to the payment instrument final amount and not equal to the remittance full payment amount, determining when the keyed value is equal to the remittance last payment amount and route the payment to posting, and determining when the keyed value is equal to the remittance last payment amount and route the payment to a second keying process.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
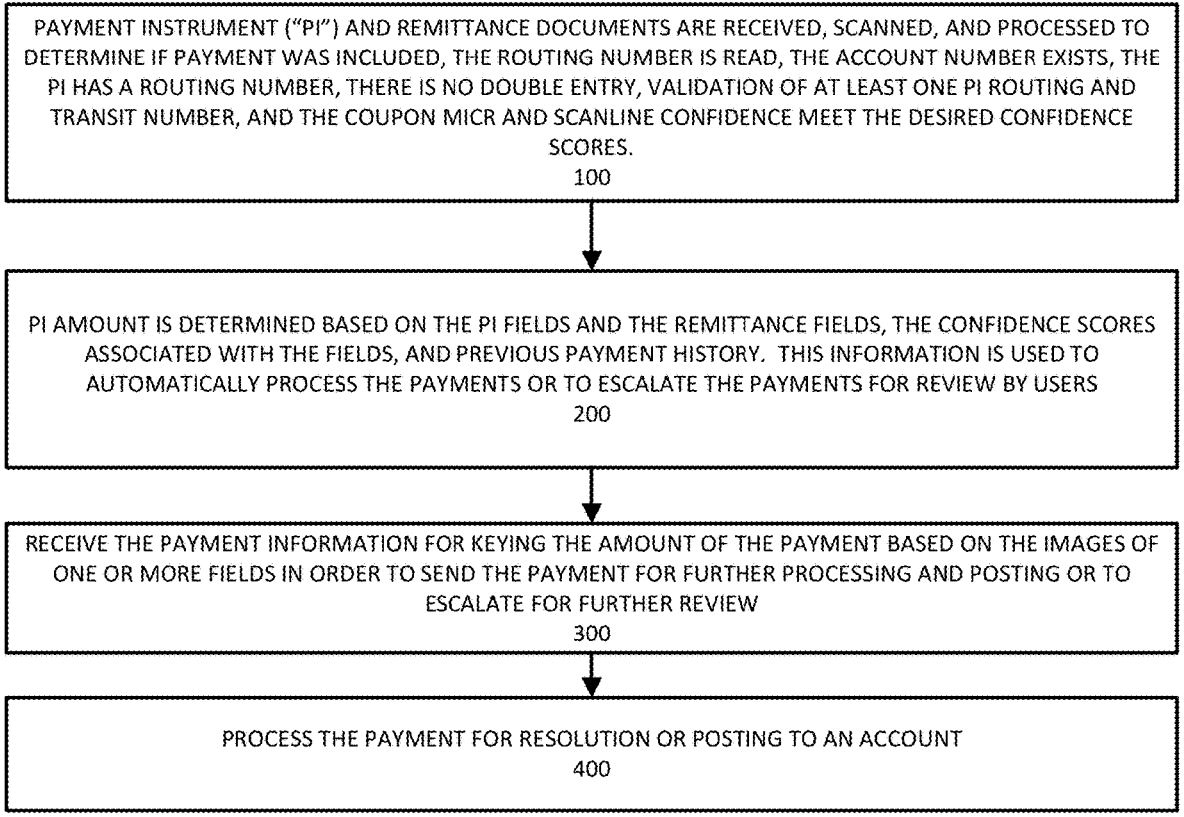
Figure 2:
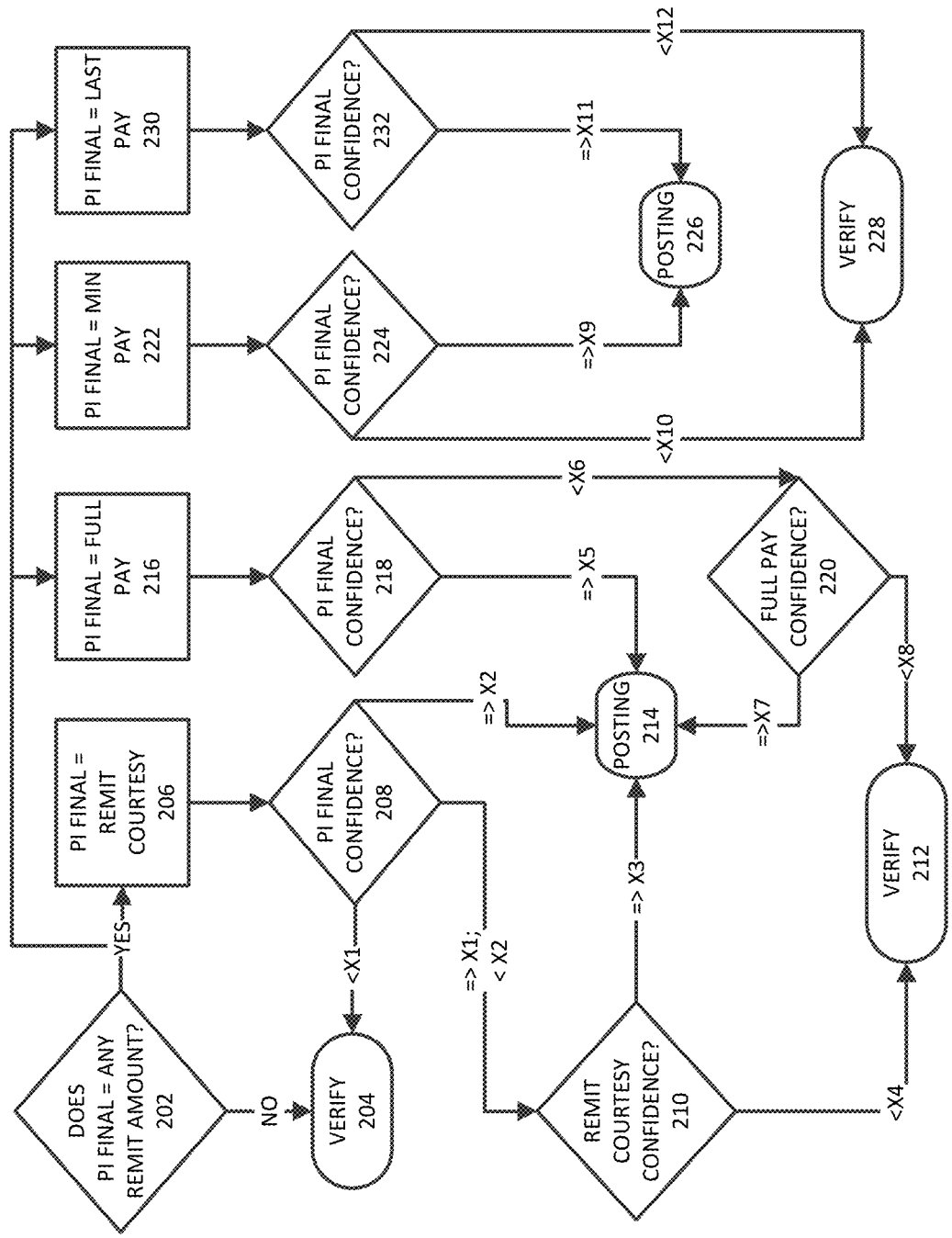
Figure 3:
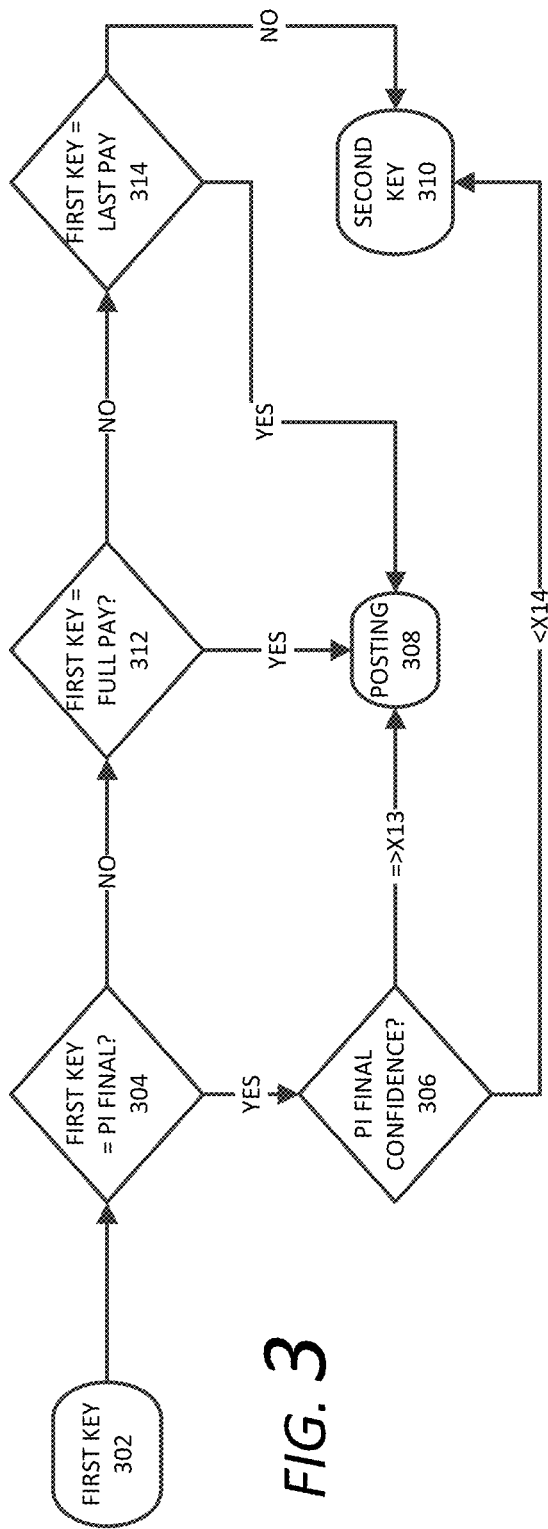
Figure 4:
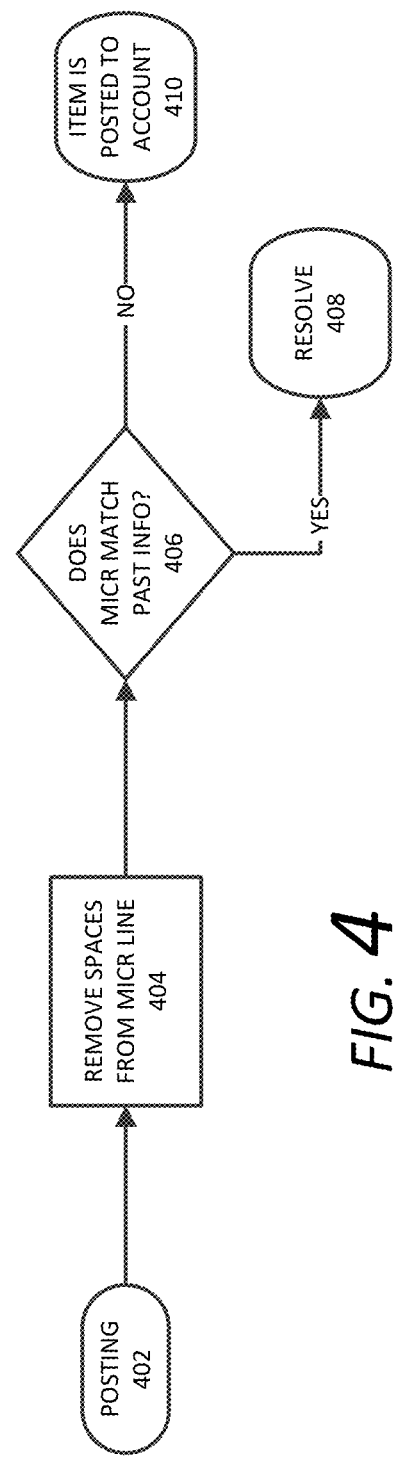

Having thus described embodiments of the invention in general terms, reference will now be made to the accompanying drawings, wherein:

FIG. 1 illustrates a high level process flow for validating and processing the payment instruments, in accordance with one embodiment of the present invention;

FIG. 2 illustrates a process flow for verifying or posting the amount associated with the payment instrument, in accordance with one embodiment of the present invention;

FIG. 3 illustrates a process flow for validating the payment based on a keyed amount, in accordance with one embodiment of the present invention;

FIG. 4 illustrates a process flow for posting the payment, in accordance with one embodiment of the present invention.

Figure 5:
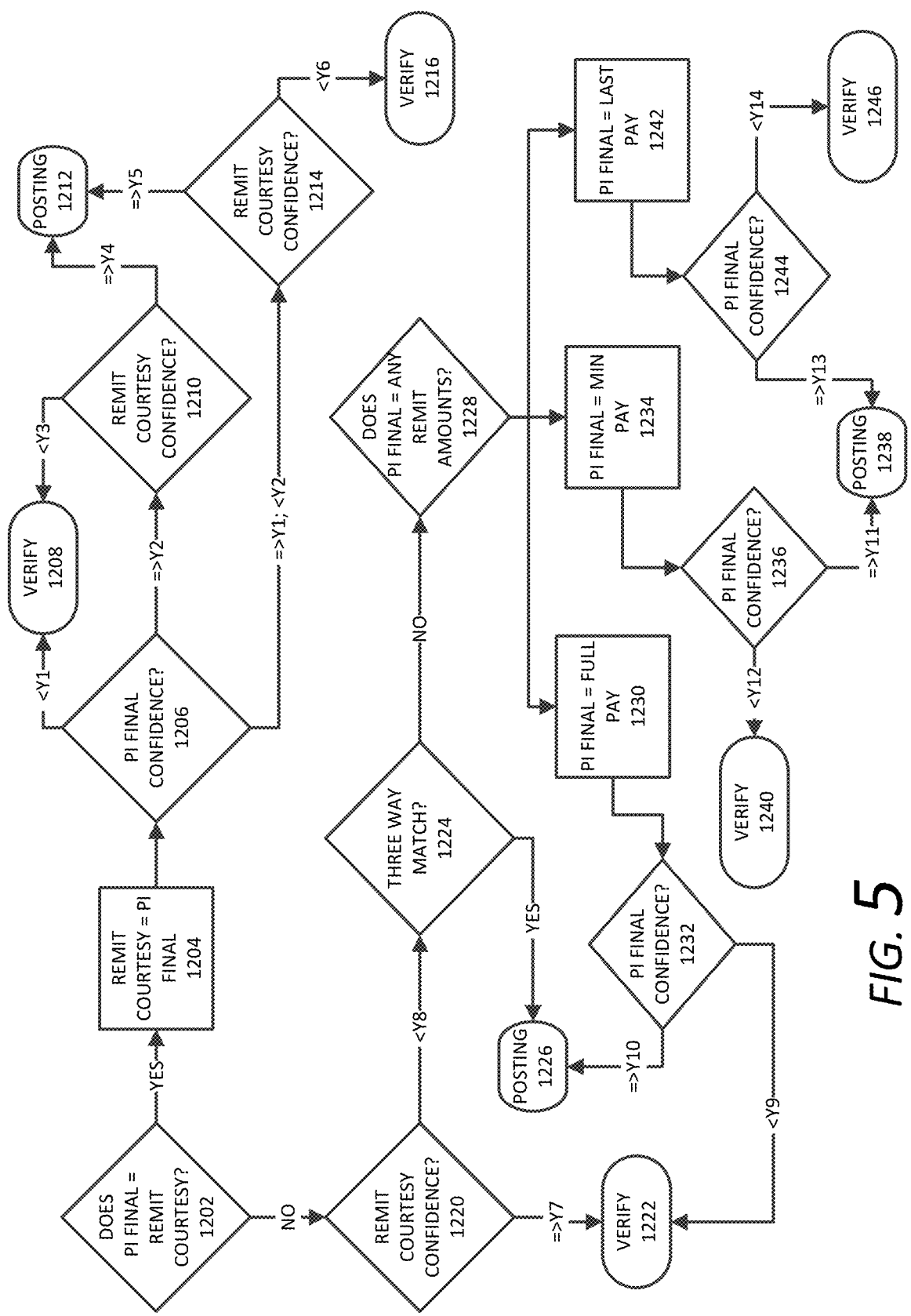
Figure 6:
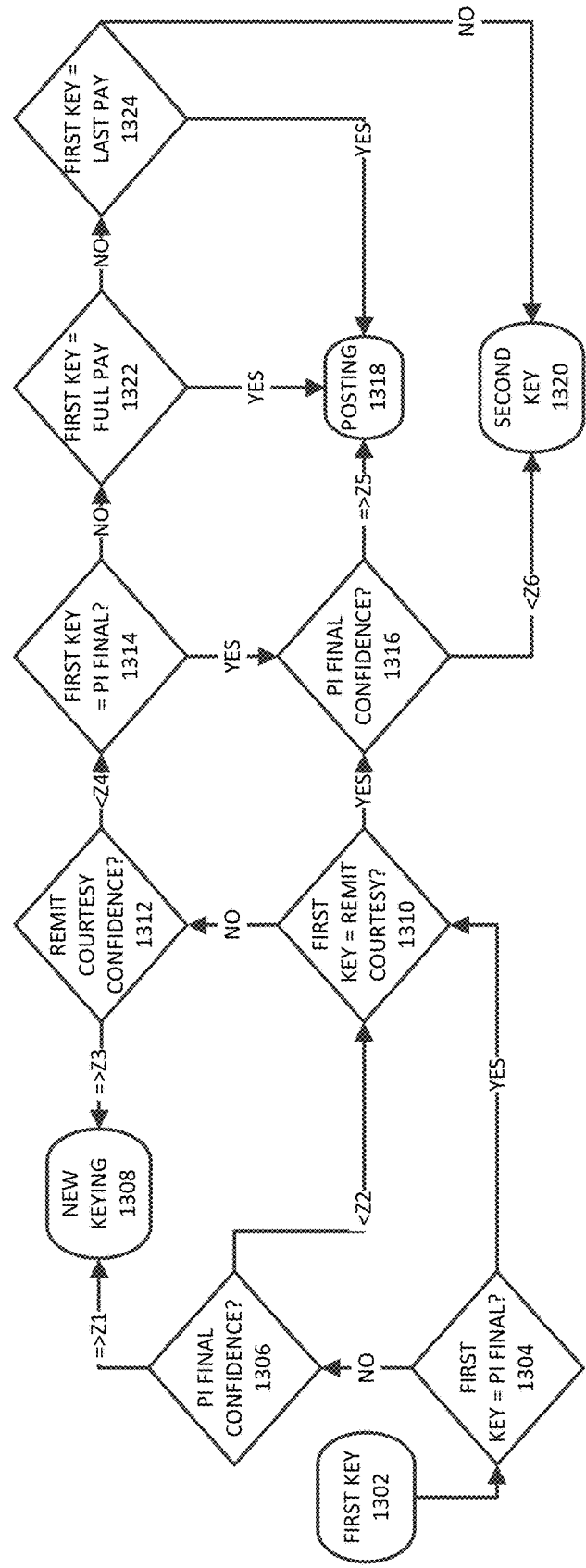
Figure 7:
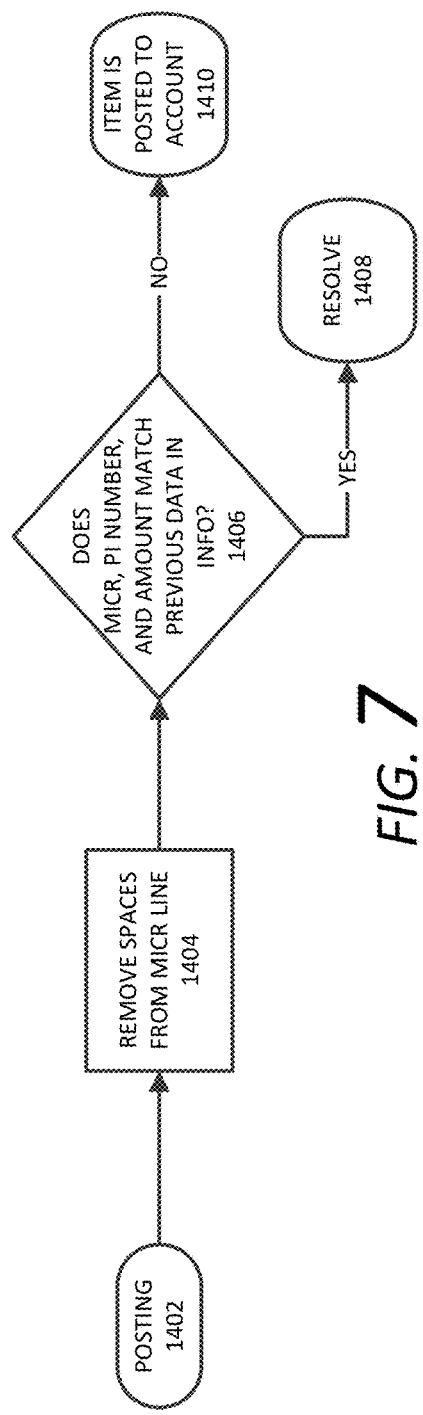
Figure 8:
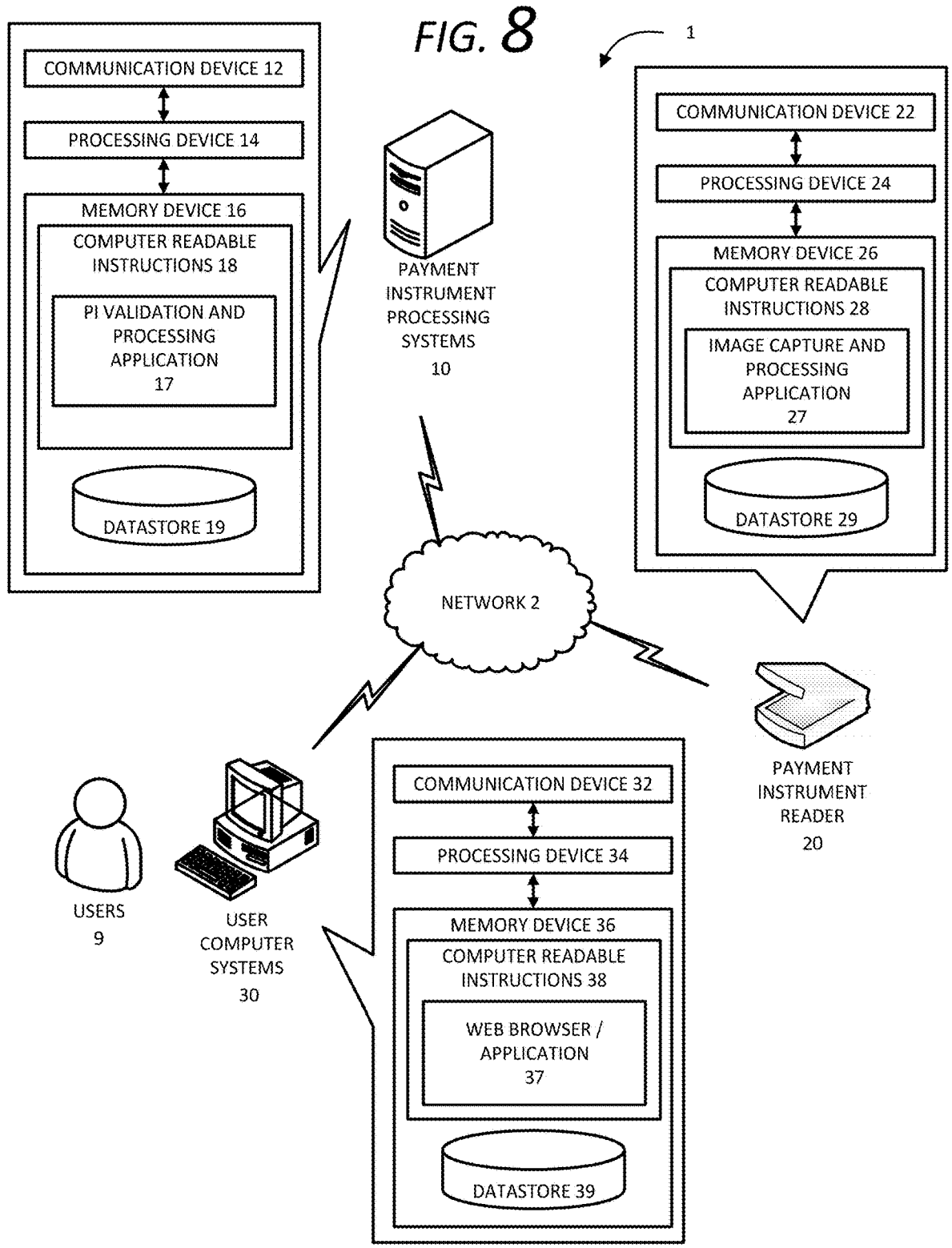

FIG. 5 illustrates another process flow for verifying or posting the amount associated with the payment instrument, in accordance with one embodiment of the present invention;

FIG. 6 illustrates another process flow for validating the payment based on a keyed amount, in accordance with one embodiment of the present invention;

FIG. 7 illustrates another process flow for posting the payment, in accordance with one embodiment of the present invention; and FIG. 8 illustrates a block system diagram for a payment instrument validation system, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution" or "bank," one of ordinary skill in the art will appreciate that other embodiments of the invention may involve other businesses or institutions that take the place of or work in conjunction with the financial institution or bank to perform one or more of the processes or steps described herein as being performed by a financial institution or bank. Still in other embodiments of the invention the financial institution or bank described herein may be replaced with other types of businesses or institutions that offer payment services to customers.

FIG. 1 illustrates a high-level process flow for validating and processing the payments received by an institution, and in particular payments received by a financial institution. As also illustrated generally in block 100, payment instruments (also described herein a "PI") (e.g., checks, or the like) and remittance documents (e.g., remittance coupons, or the like) associated with payments are received by an institution, scanned to create images (e.g., image scanned) and identify information (e.g., MICR scanned, or the like) regarding account numbers, routing numbers, amounts, or like that are needed to process the payments. As illustrated by block 200 in FIG. 1 the amounts associated with the payments may be determined, in part, from fields within the payment instrument and/or the remittance documents, confidence scores for the characters or string of characters (e.g., numbers and letters indicating the text in the fields), and/or previous payment history information or other customer account information that may be located on the remittance documents or otherwise stored by an institution. The fields, combinations of fields, confidence scores, combination of confidence scores, and payment history may be utilized to ether process the payment automatically or send the payment for further investigation and verification by a user 9 (e.g., an associate, employee, agent, contractor, manager, or the like that represents the institution). Block 300 in FIG. 1 illustrates that during the verification process by a user 9, the user 9 receives information and images associated with the payment instruments and remittance documents in order to key in amounts associated with the payments, and correct or input other information that was not correctly read using the captured images. As illustrated in block 400 in FIG. 1 the payments are processed for resolution or posting to an account after the payments have been automatically process or verified by a user 9.

Block 100 in FIG. 1 will now be discussed in further detail. The payment instrument (e.g., check for a credit card payment, or the like) and remittance document (e.g., coupon associated with a credit card payment, or the like) are typically received in an envelope by the institution for processing of the payment. The payment envelop is opened and the payment instrument reader (or remittance document reader, or both) check for exceptions, such as identifying cash in the envelope, identifying no payment and only the remittance document, identifying only payment and no remittance document, or the like. If an exception is found the payment instrument, remittance document, and/or images thereof associated with the exception are sent to a user 9 (as described herein, or another user that specifically handles exceptions) for resolution in order to determine if the payment can be processed or requires the return of the payment documents to the customer, or another notification to the customer.

If the contents of the envelope are acceptable, a determination is made as to if the routing number of the remittance document was read during the scan, a determination is made as to if the routing number exists (e.g., it is a routing number for the institution processing the payment), and/or a determination is made as to if the payment instrument has a routing number. If these conditions are not met the documents (e.g., payment instrument, remittance document, envelope, or the like), or images thereof, are sent for reconciliation and/or repair, in which users 9 as described herein (or other users) determine how to process these documents. If the conditions described above are met, the payment instrument validation system 1 matches the account numbers read from the payment instrument and/or remittance document (e.g., read from multiple locations) with the account numbers stored at the institution. If there are no matches the documents (e.g., payment instrument, remittance document, envelope, or the like), or images thereof, are sent for reconciliation and/or repair. If there is at least one match the payment instrument validation system 1 determines if there are any characters in the account number that cannot be read in the images, and also determines a confidence score for the account numbers when all the characters can be read. If there is a character that cannot be read or a confidence score below a threshold level the image reads are discarded and rerun or sent for reconciliation and/or repair. If there are no missing characters and the confidence score is above a specified threshold level then a determination is made that the account number is an account number for the institution (e.g., by determining the first four or other characters for a credit card, mortgage account number, or the like). If the account number is not an account number associated with an account in the institution, the documents (e.g., payment instrument, remittance document, envelop, or the like) and/or the associated images are sent for resolution. If the account number can be read, the payment instrument validation system 1 may validate one or more other characters of the account number, such as the last account number digit. If the one or more other account characters do not match, the documents (e.g., payment instrument, remittance document, envelop, or the like) and/or the associated images are sent for reconciliation and/or repair. If the one or more other account characters do match, one or more characters from the routing and transit number of the payment instrument are validated. If the one or more characters from the payment instrument routing and transit number match, if the coupon MICR confidence score is above a threshold level, and if the coupon scanline confidence score is above a threshold level, the payment is sent for validating the amount of the payment instrument. Otherwise, the documents (e.g., payment instrument, remittance document, envelop, or the like) and/or the associated images are sent for reconciliation and/or repair.

Block 200 of FIG. 1 illustrates that the payment instrument (also described as "PI") amount is validated by the payment instrument validation system 1. The amounts that may be captured from images of the payment instrument and/or the remittance documents may include a payment instrument final amount, a remittance courtesy amount, a full payment amount, a minimum payment amount, and/or a last payment amount. The payment instrument final amount described herein is the amount that reads off of the image of the payment instrument, which in some embodiments takes into account the amount in the courtesy box of the payment instrument (e.g., digits) and/or the amount in the legal line of the payment instrument (e.g., words). In other embodiments of the invention other areas of the payment instrument may also be used to identify the payment instrument final amount (e.g., memo line, or other areas that include the amount). The payment instrument final amount may be identified when the courtesy box and the legal amount match, or based on a confidence score associated with the courtesy box and/or the legal amount, or the like. The remittance courtesy amount descried herein is the amount the customer wrote, or was otherwise typed or entered, in the courtesy box of the remittance document. The full payment amount (e.g., full pay) is the total amount left for the balance of the payments. The minimum payment amount (e.g., min pay) is the minimum amount that the customer has to pay for the payment cycle. The last payment amount (e.g., last pay) is the amount that the customer paid during the last payment cycle. The full pay, min pay, and last pay amounts may be listed on the remittance document, and thus, be identified from the remittance document when the image of the remittance document is captured (or at a point in time after the image is captured). In other embodiments, this information may be stored by the institution (e.g., financial institution) in one or more institution systems.

A detail process flow of the payment amount validation 200 is illustrated in FIG. 2. As illustrated in block 202 a determination is made as to if the payment instrument final amount (e.g., as described above as the courtesy box amount and/or the legal line amount) equals any of the amounts associated with the remittance document (e.g., remit courtesy, the full pay, the min pay, or the last pay). If the payment instrument final amount does not equal any of the remittance amounts, then as illustrated by block 204 the payment (e.g., payment instrument, remittance documents, or the like, and/or the images thereof) are sent for verification.

As illustrated by block 206 in FIG. 2, when the remit courtesy amount (e.g., the amount the customer puts in the courtesy box in the remittance document) equals the payment instrument final amount, a determination is made of the payment instrument final amount confidence score, as illustrated block 208. As illustrated by block 204, when the payment instrument final amount confidence score of the payment instrument final amount is less than an X1 threshold level then the payment is sent for verification. Within this application, when describing something as less than, greater than, or between two values, it should be understood that less than could be less than or less than or equal to, greater than could be greater than or greater than or equal to, and between two values could inclusive or exclusive of either of the values. Moreover, this holds true for the values illustrated in FIGS. 2-7. As illustrated by block 214 when the confidence score of the payment instrument final amount is greater than an X2 threshold value then the payment is sent for automatic posting.

As illustrated by block 210, when the payment instrument final amount confidence score is greater than an X1 threshold level and less than an X2 threshold level a determination of the remittance courtesy amount confidence score is made. As illustrated by block 210 when the confidence score of the remittance courtesy is less than an X4 threshold level, then as illustrated by block 212 the payment is sent for verification. Returning to block 210, alternatively, when the remittance courtesy amount confidence score is greater than X3, then as illustrated by block 214 the payment is sent for automatic posting.

Returning to block 216 when the payment instrument final amount is equal to the full payment amount, then as illustrated by block 218 the payment instrument final amount confidence score is determined. As illustrated by block 214 if the payment instrument final amount confidence score is greater than an X5 threshold level, then the payment is sent for automatic posting. Returning to block 218 if the payment instrument is less than an X6 threshold level, then as illustrated by block 220 the full payment confidence score is determined. As illustrated by block 214, if the full payment confidence score is greater than an X7 threshold level then the payment is sent for automatic posting. However, returning to block 220 if the full payment confidence score is less than an X8 threshold level, then as illustrated by block 212 the payment is sent for verification.

Returning to block 222 when the payment instrument final amount is equal to the min payment amount, then the payment instrument final amount confidence score is determined as illustrated by block 224. As illustrated by block 226 when the payment instrument final amount confidence score is greater than an X9 threshold level, then the payment is sent for automatic posting. Returning to block 224 when the payment instrument final amount confidence score is less than an X10 threshold level, then the payment is sent for verification, as illustrated by block 228.

As illustrated by block 230, if the payment instrument final amount is equal to the last payment amount, then the payment instrument final amount confidence score is determined as illustrated by block 232. As illustrated by block 226 when the payment instrument final amount confidence score is greater than an X11 threshold level, then the payment is sent for automatic posting. Returning to block 232 when the payment instrument final amount confidence score is less than an X12 threshold level, then the payment is sent for verification, as illustrated by block 228.

As illustrated below, Table 1 provides various ranges and values for the X variables in FIG. 2. The values provided are examples, and it should be understood that in other embodiments of the invention ranges or values of the X variables may fall within the illustrated ranges, overlap the illustrated ranges, or fall outside of the illustrated ranges.

TABLE 1

Ranges and Confidence Scores for FIGS. 2 and 3

| Confidence Score Variable | Confidence Score Range | Confidence Score Narrow Range | Potential Confidence Scores |
| --- | --- | --- | --- |
| X1 | 30%-90% | 50%-70% | 50%, 55%, 60%, 65%, 70% |
| X2 | 60%-95% | 80%-95% | 80%, 85%, 90%, 95% |
| X3 | 30%-90% | 50%-70% | 50%, 55%, 60%, 65%, 70% |
| X4 | 30%-90% | 50%-70% | 50%, 55%, 60%, 65%, 70% |
| X5 | 0%-90% | 20%-70% | 50%, 55%, 60%, 65%, 70% |
| X6 | 0%-90% | 20%-70% | 50%, 55%, 60%, 65%, 70% |
| X7 | 30%-90% | 50%-70% | 50%, 55%, 60%, 65%, 70% |
| X8 | 30%-90% | 50%-70% | 50%, 55%, 60%, 65%, 70% |
| X9 | 30%-90% | 50%-70% | 50%, 55%, 60%, 65%, 70% |
| X10 | 30%-90% | 50%-70% | 50%, 55%, 60%, 65%, 70% |
| X11 | 30%-90% | 50%-70% | 50%, 55%, 60%, 65%, 70% |
| X12 | 30%-90% | 50%-70% | 50%, 55%, 60%, 65%, 70% |
| X13 (FIG. 3) | 30%-90% | 50%-70% | 50%, 55%, 60%, 65%, 70% |
| X14 (FIG. 3) | 30%-90% | 50%-70% | 50%, 55%, 60%, 65%, 70% |

Block 300 in FIG. 1 indicates that the payments may be verified by users 9 inputting keyed amounts when the fields and/or confidence scores associated with payments do not meet the requirements for automatic verification and posting. FIG. 3 illustrates a process for validating the payment based on a keyed amount when the payments are sent to users 9 for verification. FIG. 3 illustrates a keying verification process in which one or more users 9 view the images associated with the payment in order to verify the amount associated with the payment. As illustrated in FIG. 3, when a payment is sent for verification it is sent to a user 9 to review the image of the payment instrument and/or the remittance document. As illustrated by block 302, the user 9 enters a first keyed value for the payment instrument final amount based on viewing the image of the payment instrument. In some embodiments the user 9 may make the decision of the payment instrument final amount based on the images of the courtesy box value, the legal line value, both, or another value, for example the value of the image of courtesy box in the remittance document.

As illustrated by block 304 the payment instrument validation system 1 determines if the first keyed value entered by the user 9 meets the payment instrument final amount. As illustrated by block 306, when the first keyed value equals the payment instrument final amount, a determination is made of the payment instrument final confidence score. As illustrated by block 308, if the payment instrument final amount confidence score is greater than an X13 threshold level then the payment is sent for automatic posting. Returning to block 306 in FIG. 3, when the payment instrument final amount confidence score is less than an X14 threshold level then the payment is sent for second keying, as illustrated by block 310. In some embodiments of the invention, sent for second keying may place the payment back in the queue for keying by a second user 9. In other embodiments of the invention second keying may include sending the payment to an escalated keying process to a user 9 that is specially trained and has additional information (e.g., access to customer account information, or the like) to verify the payment amount.

Returning to block 304 if the first keyed payment does not equal the payment instrument final amount, then the process moves to block 312. As illustrated by block 312, a determination is made if the first keyed payment amount equals the full payment amount. As illustrated by block 308 if the first keyed payment amount equals the full payment amount then the payment is sent for automatic posting. Returning to block 312, if the first keyed payment amount does not equal the full payment amount then the process proceeds to block 314. As illustrated in block 314, a decision is made if the first keyed payment amount equals the last payment amount. As illustrated by block 308, when the first keyed payment amount equals the last payment amount then the payment is sent to posting. However, as illustrated by block 310 when the first keyed payment does not equal the last payment amount then the payment is sent for a second keying, as previously discussed.

As illustrated in block 400 in FIG. 1 the payments are processed for resolution or posting to an account. FIG. 4 illustrates the posting process in further detail after the payment has be designated for posting (e.g., with or without sending the payment for keying verification). As illustrated by block 402 a payment is received for posting. As illustrated by block 404 any spaces in the MICR line are removed by the system. The spaces may be included between characters depending on how the image capture software captures spaces between characters in the payment instrument (i.e., reads them as spaces and includes the spaces or removes the spaces whenever a space is identified). As illustrated by block 406, a determination is made as to if the MICR line of the payment matches past information for other payments.

When the MICR line of a present payment does meet a past payment, then the present payment may be a duplicate payment. As such, as illustrated in block 408 the present payment is escalated for resolution by a user that has special training and access to additional information to help resolve the potential duplicate payment. As illustrated by block 410 if the present payment does not match any past payment information then the present payment is posted to the customer's account.

The process flow illustrated in FIGS. 2 through 4 has improved the processing of payments in that the number of payments that get posted to customers' accounts with incorrect payment amounts has been reduced significantly. In some embodiments the improvements have ranged from 5%-80%, 10%-80%, 20%-40%, or 25%-35% reductions in the number of payments that get posted to customers' accounts with incorrect amounts. Moreover, in some embodiments the reductions in the number of payments that get posted to customers' accounts with incorrect amounts may be decreased by an amount greater than or equal to 5%, 10%, 15%, 20%, 25%, 30%, 35%, 40%, 45%, 50%, 55%, 60%, 65%, 70%, 75%, 80%, 90%, 100%, or more, or fall within any ranges that falls outside of these percentages, falls within these percentages, or overlaps any of the percentages described herein. However, further improvements to the process may be implemented, which may further reduce the number of incorrect payments that may be posted to customers' accounts, as is explained in further detail with respect to FIGS. 5-7.

FIG. 5 illustrates another embodiment of FIG. 2 in which the payment instrument (e.g., "PI") amount is validated using the payment instrument validation system 1, in order to reduce the amount of payments that are posted to customers' accounts with incorrect payment amounts. As illustrated by block 1202 in FIG. 5, a determination is first made as to if the payment instrument final equals the remit courtesy amount on the remittance document. As illustrated by block 1204 when the remit courtesy amount meets the payment instrument final amount a determination of the payment instrument final amount confidence score is made, as illustrated by block 1206. As illustrated by block 1208 when the payment instrument final amount confidence score is less than a Y1 threshold level then the payment is sent for verification. Returning to block 1206, when the payment instrument final amount confidence score is greater than a Y2 threshold level, a determination of the remittance courtesy amount confidence score is made, as illustrated by block 1210. As illustrated by block 1208 when the remittance courtesy amount confidence score is less than a Y3 threshold level, then the payment is sent for verification. However, if the remittance courtesy amount confidence score is greater than a Y4 threshold level then the payment is sent for automatic posting, as illustrated by block 1212. However, returning to block 1206, when the payment instrument final amount confidence score is greater than the Y1 score and less than the Y2 score, then a determination is made of the remittance courtesy amount confidence score, as illustrated by block 1214. As illustrated by block 1212 when the remittance courtesy confidence score is greater than a Y5 threshold level then the payment is sent for automatic posting. However, returning to block 1214 when the remittance courtesy amount confidence score is less than a Y6 threshold level, then the payment is sent for verification, as illustrated by block 1216.

Returning to block 1202, when the payment instrument final amount does not equal the remittance courtesy amount a determination is made for the remittance courtesy amount confidence score, as illustrated by block 1220. As illustrated by block 1220 when the remittance courtesy amount confidence score is greater than a Y7 threshold level, then the payment is sent for verification, as illustrated by block 1222. Returning to block 1220, when the remittance courtesy amount confidence score is less than a Y8 threshold level, then a determination is made if there is a three way match, as illustrated by block 1224. For example, the three way match may be that the payment instrument final amount equals two of the other payment amounts (e.g., remit courtesy amount, full pay, last pay, and min pay). As illustrated by block 1226, if there is a three way match then the payment is sent for posting.

However, when there is no three way match, then a determination is made if the payment instrument final amount equals any of the amounts on the remittance document, as illustrated by block 1228. As illustrated by block 1230, when the payment instrument final amount equals the full payment amount on the remittance document a payment instrument final amount confidence score is determined as illustrated by block 1232. As illustrated by block 1222, when the payment instrument final confidence score is less than a Y9 threshold level, then the payment instrument is sent for verification. Returning to block 1232, when the payment instrument final amount confidence score is greater than a Z10 threshold level, then the payment is sent for posting, as illustrated by block 1226.

Returning to block 1234, when the payment instrument final amount is equal to the minimum payment amount, then the payment instrument final amount confidence score is determined as illustrated by block 1236. As illustrated by block 1238 when the payment instrument final amount confidence score is greater than a Y11 threshold level, then the payment is sent for automatic posting. Returning to block 1236 when the payment instrument final amount confidence score is less than a Y12 threshold level, then the payment is sent for verification, as illustrated by block 1240.

Returning to block 1242, if the payment instrument final amount is equal to the last payment amount, then the payment instrument final amount confidence score is determined as illustrated by block 1244. As illustrated by block 1238 when the payment instrument final amount confidence score is greater than a Y13 threshold level, then the payment is sent for automatic posting. Returning to block 1244 when the payment instrument final amount confidence score is less than a Y14 threshold level, then the payment is sent for verification, as illustrated by block 1246.

As illustrated below, Table 2 provides various ranges and values for the Y variables in FIG. 5. The values provided are examples, and it should be understood that in other embodiments of the invention ranges or values of the Y variables may fall within the illustrated ranges, overlap the illustrated ranges, or fall outside of the illustrated ranges.

TABLE 2

Ranges and Confidence Scores for FIG. 5

| Confidence Score Variable | Confidence Score Range | Confidence Score Narrow Range | Potential Confidence Scores |
|---|---|---|---|
| Y1  | 50%-95% | 70%-90% | 70%, 75%, 80%, 85%, 90% |
| Y2  | 30%-90% | 50%-70% | 50%, 55%, 60%, 65%, 70% |
| Y3  | 10%-60% | 20%-40% | 20%, 25%, 30%, 35%, 40% |
| Y4  | 10%-60% | 20%-40% | 20%, 25%, 30%, 35%, 40% |
| Y5  | 30%-90% | 50%-70% | 50%, 55%, 60%, 65%, 70% |
| Y6  | 30%-90% | 50%-70% | 50%, 55%, 60%, 65%, 70% |
| Y7  | 50%-95% | 70%-90% | 70%, 75%, 80%, 85%, 90% |
| Y8  | 50%-95% | 70%-90% | 70%, 75%, 80%, 85%, 90% |
| Y9  | 10%-70% | 30%-50% | 30%, 35%, 40%, 45%, 50% |
| Y10 | 10%-70% | 30%-50% | 30%, 35%, 40%, 45%, 50% |
| Y11 | 30%-90% | 50%-70% | 50%, 55%, 60%, 65%, 70% |
| Y12 | 30%-90% | 50%-70% | 50%, 55%, 60%, 65%, 70% |
| Y13 | 30%-90% | 50%-70% | 50%, 55%, 60%, 65%, 70% |
| Y14 | 30%-90% | 50%-70% | 50%, 55%, 60%, 65%, 70% |

FIG. 6 illustrates another example of a keying verification process (e.g., previously described with respect to block 300 in FIG. 1 and in FIG. 3), in which one or more users 9 view the images associated with the payment in order to verify the amount associated with the payment. As illustrated in FIG. 6, when a payment is sent for verification it is sent to a user 9 to review the image of the payment instrument and/or the remittance document. As illustrated by block 1302 the user 9 enters a first keyed value for the payment amount based on viewing the image of the payment instrument and/or remittance document. In some embodiments, the user 9 may make the decision based on viewing images of the courtesy box value, the legal line value, or both in the payment instrument, or another value, for example the value of the amount listed in the courtesy box in the remittance document.

As illustrated by block 1304 the system determines if the first keyed value entered by the user 9 meets the payment instrument final amount. If the first keyed value does not equal the payment instrument final amount, then the payment instrument final amount confidence score is determined, as illustrated by block 1306. If the payment instrument final amount confidence score is greater than a Z1 threshold value, then a new keying process is undertaken, as illustrated by block 1308. The new keying process may include escalating the investigation of the payment to a user 9 or to a specialized user 9 that has more experience and/or additional access to information (e.g., customer accounts, transactions, or the like) in order to determine additional information for resolving the payment. In other embodiments of the invention, instead of sending the payment for a new keying process, the payment is routed to a second keying process.

Returning to block 1306, when the payment instrument final amount confidence score is less than a Z2 threshold level then a determination is made if the first keyed amount equals the remittance courtesy amount, as illustrated by block 1310. Moreover, returning to block 1304, when the first keyed amount is equal to the payment instrument final amount, the process also continues to block 1310 in which the determination is made if the first keyed amount equals the remittance courtesy amount. As illustrated by block 1312, when the first keyed amount does not equal the remittance courtesy amount a determination of the remittance courtesy amount confidence score is made. When the remittance courtesy amount confidence score is greater than a Z3 threshold level, then the payment is sent for the new keying process as illustrated by block 1308. However, retuning to block 1312, when the remittance courtesy amount confidence score is less than a Z4 threshold level, then a determination is made if the first keyed amount equals the payment instrument final amount, as illustrated in block 1314.

As illustrated by block 1314, when the first keyed amount equals the payment instrument final amount, a determination of the payment instrument final amount confidence score is made. Moreover, returning to block 1310, when the first keyed amount does equal the remittance courtesy amount, then a determination of the payment instrument final amount confidence score is made, as illustrated by block 1314.

As illustrated by block 1316, when the payment instrument final amount confidence score is greater than a Z5 threshold level, then the payment is sent for automatic posting, as illustrated by block 1318. Returning to block 1316, when the payment instrument final amount confidence score is less than a Z6 threshold level, then the payment is sent for second keying, as illustrated in block 1320. As previously discussed a second keying may include putting the payment back into the keying queue, submitting the payment directly to another user 9 for keying, escalating the payment to a new keying process as illustrated in block 1308, or another like keying process.

Returning to block 1314, when the first keyed amount does not equal the payment instrument final amount, then a determination is made if the first keyed amount equals the full payment amount, as illustrated by block 1322. As illustrated by block 1318, when the first keyed amount equals the full payment amount, then the payment is sent to posting. Alternatively, when the first keyed amount does not equal the full payment amount, then a determination is made if the first keyed amount equals the last payment amount, as illustrated by block 1324. As such, when the first keyed amount does equal the last payment amount, then the payment is sent for automatic posting, as illustrated by block 1318. However, returning to block 1324, when the first keyed amount does not equal the last payment amount then the payment is sent for a second key, as illustrated by block 1320.

As illustrated below, Table 3 provides various ranges and values for the Z variables in FIG. 6. The values provided are examples, and it should be understood that in other embodiments of the invention ranges or values of the Z variables may fall within the illustrated ranges, overlap the illustrated ranges, or fall outside of the illustrated ranges.

TABLE 3

Ranges and Confidence Scores for FIG. 6

| Confidence Score Variable | Confidence Score Range | Confidence Score Narrow Range | Potential Confidence Scores |
|---|---|---|---|
| Z1 | 50%-95% | 70%-90% | 70%, 75%, 80%, 85%, 90% |
| Z2 | 50%-95% | 70%-90% | 70%, 75%, 80%, 85%, 90% |
| Z3 | 50%-95% | 70%-90% | 70%, 75%, 80%, 85%, 90% |
| Z4 | 50%-95% | 70%-90% | 70%, 75%, 80%, 85%, 90% |
| Z5 | 30%-90% | 50%-70% | 50%, 55%, 60%, 65%, 70% |
| Z6 | 30%-90% | 50%-70% | 50%, 55%, 60%, 65%, 70% |

FIG. 7 illustrates another embodiment of the posting process (as previously described with respect to block 400 in FIG. 1 and FIG. 3) after the payment has been designated for posting (e.g., with or without sending the payment for keying verification). As illustrated by block 1402 a payment is received for posting. As illustrated by block 1404 any spaces in the MICR line are removed by the system. As illustrated by block 1406, a determination is made as to if the MICR line, payment instrument number, and amount of the present payment matches any past information for other payments. As illustrated by block 1408 when the MICR line, payment instrument number, or amount of the present payment does match another payment, the present payment may be a duplicate payment, and as such, the present payment is escalated for resolution by a user 9 or another user that has special training and access to additional information to help resolve the potential duplicate payment. As illustrated by block 1410 if the MICR line, payment instrument number, or amount of the present payment does not match any other payments, then the present payment is posted to the customer's account.

The processes illustrated in FIGS. 5 through 7 have improved the processing of payments in that the number of payments that get posted to customers' accounts with incorrect payment amounts has been reduced significantly as explained in further detail below. However, further improvements to the process may be implemented, which may further reduce the number of incorrect payments that may be posted to customers' accounts, or otherwise improve the validation and processing of payments.

The embodiments of the present invention provide improvements to processing payments by reducing human interaction, reducing incorrect payments posted on customer accounts, and reducing costs associated with the incorrect payments. For example, large institutions, such as financial institutions, may process hundreds of thousands of payments on a daily basis, which correlates to millions of payments over the span of a year. As such, processing this many payments may result in hundreds or thousands of incorrect payments posted on a monthly basis, and thousands or tens of thousands of incorrect payments posted on a yearly basis. Using the processes described herein, reduces the number of incorrect payments that make it to final posting.

There are a number of features that improve the processing of the payments (e.g., reduces the number of incorrect payments posted) for example, comparing different fields between the payment instruments and remittance documents, identifying and/or altering confidence score thresholds, automatically posting payments based on the compared fields and/or confidence scores, and notifying users 9 when keying values are inconsistent with values read from the payment documents (e.g., payment instrument and/or remittance documents).

In one embodiment of the invention in order to reduce the number of payments that are sent to users 9 for keying verification, the present invention has identified that lowering the confidence threshold value, or removing the threshold altogether, for payments in which the payment instrument final amount (e.g. payment identified from the image of the payment instrument) equals the full payment amount on the remittance document (or otherwise stored by the institution). As such, Table 4 below lists the improvements in the processes achieved between the process illustrated in FIGS. 2 through 4, and various options for implementing the process in FIGS. 5-7. Data was collected for 200,000 payments and the payments were run through trials using both the process illustrated in FIG. 2, and by lowering the confidence score threshold as illustrated in FIG. 5 for the situation when the payment instrument final amount equals the full payment amount (see block 216 in FIG. 2 and Table 1; and block 1230 in FIG. 5 and Table 2). As illustrated by Table 4 by decreasing the final confidence level threshold from 60% in FIG. 2, down to 40%, 20%, or even removing the confidence score altogether (e.g., 0%), the number of incorrect payments that posted did not change, while the number of payments that proceeded straight through to automatic posting increased (e.g., increased by 987 and 1097 payments). As such, reducing the confidence score threshold for the payment instrument final amount did not have any effect on the number of potential incorrect payments posted.

TABLE 4

Updated Process vs. Suggested Process

| Parameter | FIGS. 2 | FIG. 5 - Option #1 | FIG. 5 - Option #2 |
|---|---|---|---|
| PI Final Confidence | 60% | 20% | 0 |
| Full Pay Confidence | 60% | 20% | 0 |
| Automatic Posting | 27,813 | 28,800 | 28,910 |
| Errors | 0 | 0 | 0 |
| Increased In Postings | N/A | 987 | 1097 |

Moreover, implementing a process step into the validation processing in which the payments are routed for posting when the payment instrument final amount equals the remit courtesy amount and one of the minimum pay, last pay, or full pay amounts, as illustrated in block 1224 in FIG. 5, improvements in the payment instrument process can be achieved. When this situation occurs, approximately 500 new payments out of 200,000 (e.g., approximately a 0.25% improvement in automatic posting rate) can be automatically posted without introducing any new incorrect payments to posting on the customers' accounts.

A number of additional changes to the process could be made to further reduce the number of incorrect payments that post to the customers' accounts. For example, the confidence levels for processing the payments when the payment instrument final amount equals the remittance courtesy amount may be adjusted to decrease the amount of incorrect payments posted to customers' accounts with a minimal increase in the number of payments that are sent for user keying validation (as illustrated in blocks 206 and 208 in FIG. 2; and blocks 1204 and 1206 in FIG. 5). Table 5 illustrates the changes identified by processing the same 200,000 payments when changes are made to the routing of payments and the confidence score thresholds for the payment instrument final amount and the remittance courtesy amount, when the payment instrument final amount equals the remittance courtesy amount.

TABLE 5

Updated Process vs. Suggested Process - Confidence Score Threshold Change

| Parameter | FIG. 2 | FIG. 5 (Option #1) | FIG. 5 (Option #2) |
| --- | --- | --- | --- |
| PI Final Confidence | 90% | 80% | 70% |
| Remit Courtesy Confidence | 0% | 30% | 50% |
| Automatic Posting | 39,406 | 36,491 | 34,472 |
| Errors | 7 | 2 | 1 |
| Decrease In Incorrect Payments Posted | N/A | −5 | −6 |
| Increase In Postings | N/A | −2,915 | −4,934 |

As illustrated by the results in Table 5, by reducing the payment instrument final confidence score (e.g., reducing 90% to 80% in option #1 and 90% to 70% for option #2), and by increasing the remittance courtesy confidence score (e.g., from 0 to 30% in option #1 and from 0 to 50% in option #2), not only are the incorrect payments posted reduced (e.g., from 7 down to 2 or down to 1), but there is only a minimal increase (e.g., approximately 3,000 and 5,000 payments) in the number of payments sent to a user for verification. A single user 9 may be able to key approximately 900 payments per hour, and as such the increase in payments that are keyed by a user 9 only relates to approximately 3 to 6 hours of user time per 200,000 payments. This increase in hours may be offset by the amount of hours that another user 9 no longer would have to work to correct a payment that was incorrectly posted to a customer account.

The improvements illustrated in the processes of FIG. 2 may be further improved as illustrated in FIG. 5, in which payments are forced to verification when the payment instrument final amount does not equal the remittance courtesy amount (see blocks 1202 and 1220 in FIG. 5), and the remittance courtesy confidence score is over 80% (see blocks 1220 and 1222 in FIG. 5 and Table 3). Based on this routing, payments that have different amounts in the payment instrument and the remittance document should be sent to verification instead of automatically sent for posting when the remittance document value has a high level of confidence. For example, payments may be sent to verification when a check does not match the remittance coupon value, but the coupon value has a high confidence score. Using this routing in FIG. 5, approximately 40 to 70 percent of additional incorrect payments could be captured and sent for verification instead of being posted to customers' accounts. However, the decrease in the amount of incorrect payments posted comes at the cost of verifying an additional 0.28% of the payments (e.g., 560 additional payments out of a sample size of 200,000).

The improvements illustrated in the processes of FIG. 3, which relates to a keying verification process may be further improved by notifying a user 9 when the user 9 has keyed an amount that disagrees with either a payment instrument final amount or a remittance courtesy amount, and the amounts have confidence scores over specific threshold values (e.g., 80%) (see blocks 1304, 1306, 1310, 1312, and 1308 in FIG. 6). When this occurs a message may be presented to the user 9 (e.g., e-mail, pop-up notification, text, alert within the keying application, or the like) that requests that the user 9 take a closer look, rekey the amount, escalate the payment for further review, or the like. The message may force the user 9 to slow down, verify the courtesy amount or legal amount in the payment instrument, and/or make a more accurate decision regarding the amount of the payment instrument. This process improvement, like the other improvements described herein, was tested and verified that it would have caught approximately 40 to 50% of the incorrect payments that were posted to customers' accounts based on user 9 keying errors.

The additional improvements illustrated in the processes in FIGS. 5-7 over the processes illustrated in FIGS. 2-4 further reduce the amount of incorrect payments posted to customers' accounts by approximately 3 to 10 incorrect payments per 200,000 payments processed. The throughput of the payments processed without having to verify the payments through a user keying validation process is approximately 80 to 90 percent for both FIGS. 2-4 and FIGS. 5-7, with FIGS. 5-7 providing a slightly reduced throughput rate (e.g., 0.1 to 0.3% reductions in the throughput rate automatic posting of processes). However, the trade off in the reduced amount of incorrect payments posted to customers' accounts makes up for the additional payments that may have to be keyed by the users 9.

In other embodiments of the invention other processing steps may be instituted in order to improve customer satisfaction. For example, in one embodiment when an incorrect payment amount is posted to a customer account any additional payments (e.g., the next payment, next three payments, or other like number of payments) from the same customer may be flagged and routed for escalation to a specialized user that has more experience and access to information than the verification users 9. This process routing ensures that additional payments from the customer are not posted with an incorrect amount when the customer has experienced incorrect posting of a payment in the past.

In still other examples, when there is a new user 9 verifying payments, when a particular user 9 has a threshold incorrect payment posted percentage (e.g., has repeat incorrect keying amounts), when payments are received from a particular institution or customer that has repeated images or image recognition issues, the payments associated with these users 9 or customers may automatically be routed for keying by another user 9 or escalated for a more detailed review of the payments.

FIG. 8 illustrates a payment instrument validation system 1, in accordance with an embodiment of the present invention. As illustrated in FIG. 8, the payment instrument processing systems 10 are operatively coupled, via a network 2 to the payment instrument readers 20, and the user computer systems 30. As discussed herein, in this way, payment instrument processing systems 10 may be used to process payment instruments by determining amounts associated with the payment instrument and/or remittance document using one or more fields, and one or more confidence scores associated with images from the fields. Depending on the confidence scores, the payments instruments may be processed and posted, or may be sent to a user 9 for keying verification of the payment instrument amounts. The keyed verification amount may again be compared with one or more fields from the payment instrument and/or the remittance document, and one or more confidence scores associated with the one more fields may be used to process the payment. FIG. 8 illustrates only one example of embodiments of a payment instrument validation system 1, and it will be appreciated that in other embodiments one or more of the systems (e.g., computers, mobile devices, servers, or other like systems) may be combined into a single system or be made up of multiple systems.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

As illustrated in FIG. 8, the payment instrument processing system 10 generally comprises a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12 and the memory device 16. The processing device 14 uses the communication device 12 to communicate with the network 2 and other devices on the network 2, such as, but not limited to, the payment instrument reader 20, and the user computer systems 30. As such, the communication device 12 generally comprises a modem, server, or other device for communicating with other devices on the network 2.

As further illustrated in FIG. 8, the payment instrument processing systems 10 comprise computer-readable instructions 18 stored in the memory device 16, which in one embodiment includes the computer-readable instructions 18 of a payment instrument validation and processing application 17. In some embodiments, the memory device 16 includes a datastore 19 for storing data related to the payment instrument processing systems 10, including but not limited to data created and/or used by the payment instrument validation and processing application 17. As discussed above the payment instrument validation and processing application 17 determines based on the combination of one or more fields and one or more confidence scores how to rout the payment for posting validation and/or posting.

As further illustrated in FIG. 8, the payment instrument readers 20 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the payment instrument processing systems 10 and the user computer systems 30. As such, the communication device 22 generally comprises a modem, server, or other device(s) for communicating with other devices on the network 2.

As illustrated in FIG. 8, the payment instrument readers 20 comprise computer-readable program instructions 28 stored in the memory device 26, which in one embodiment includes the computer-readable instructions 28 of an image capture and processing application 27. In some embodiments, the memory device 26 includes a datastore 29 for storing data related to the payment instrument readers 20, including but not limited to data created and/or used by the image capture and processing application 27. The image capture and processing application 27, as discussed above, captures images of the payment instrument and remittance documents or one or more fields within the payment instrument and remittance documents, as the payment instruments and remittance documents are scanned. The images or data associated with the images may be store for processing and/or sent to other systems for processing.

As further illustrated in FIG. 8, the user computer systems 30 generally comprise a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the payment instrument processing systems 10, and the payment instrument readers 20. As such, the communication device 32 generally comprises a modem, server, or other devices for communicating with other devices on the network 2, and a display, camera, keypad, mouse, keyboard, microphone, and/or speakers for communicating with one or more users 9. The user computer systems 30 may include, for example, a personal computer, a laptop, a mobile device (e.g., phone, smartphone, tablet, or personal display device ("PDA"), or the like) or other devices, or the like.

As illustrated in FIG. 8, the online banking systems 30 comprise computer-readable program instructions 38 stored in the memory device 36, which in one embodiment includes the computer-readable instructions 38 of web browser and/application 37. In some embodiments, the memory device 36 includes a datastore 39 for storing data related to the user computer systems 30, including but not limited to data created and/or used by the web browser/application 37. The web browser/application 37 allows the users 9 to communicate with the payment instrument validation and processing application 17 (e.g., payment routing interfaces, the keying interfaces, the new keying interfaces, or the like), the image capture and processing application 27, or other applications that may be related to validating and processing the payment instruments provided by a financial institution or a third-party in order to provide interfaces for the users 9 to review images of the payment instruments or the remittance documents in order to key information from the images into the processing systems.

It is understood that one or more of the systems, devices, applications, or the like described herein can be combined or separated into other and devices described herein in various embodiments of the invention. It is further understood that these embodiments still function in the same or similar way as the embodiments described herein. For example, the applications or parts of the applications described herein may be completely or partially stored on the systems described herein or on other systems not specifically described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing validation and processing of a plurality of payments using a plurality of payment instruments and a plurality of remittance documents, the system comprising:
   one or more memory devices; and
   one or more processing devices operatively coupled to the one or more memory devices, wherein the one or more processing devices are configured to execute computer-readable program code to:
   receive a plurality of payment instrument images, wherein the plurality of payment instrument images are captured from the plurality of payment instruments by a payment instrument reader;
   identify a payment instrument final amount for each of the plurality of payment instruments from each of the plurality of payment instruments images of each of the plurality of payment instruments;
   receive a plurality of remittance document images, wherein the plurality of remittance document images are captured from each of the plurality of remittance documents associated with each of the plurality of payment instruments by a remittance document reader;
   access account information associated with each of the plurality of remittance documents by accessing financial institution systems;
   identify a remittance courtesy amount, a remittance full payment amount, a remittance minimum payment amount, and a remittance last payment amount for each of the plurality of remittance documents, wherein the remittance courtesy amount is identified from a remittance document image and the remittance full payment amount, the remittance minimum payment amount, and the remittance last payment amount are identified from either the remittance document image or the account information stored on the financial institution systems;
   determine when the payment instrument final amount equals the remittance courtesy amount and determine a payment instrument final amount confidence score and:
      route the plurality of payments for verification when the payment instrument final amount confidence score is less than a first threshold for the payment instrument final amount confidence score;
      when the payment instrument final amount confidence score is greater than or equal to a second threshold for the payment instrument final amount confidence score determine a remittance courtesy amount confidence score and:
         route the plurality of payments for verification when the remittance courtesy amount confidence score is less than a third threshold for the remittance courtesy amount confidence score; and
         route the plurality of payments for posting when the remittance courtesy amount confidence score is greater than a fourth threshold for the remittance courtesy amount confidence score; and
      when the payment instrument final amount confidence score is greater than or equal to the first threshold but less than the second threshold for the payment instrument final amount confidence score:
         route the plurality of payments for posting when the remittance courtesy amount confidence score is greater than or equal to a fifth threshold for the remittance courtesy amount confidence score; and route the plurality of payments for verification when the remittance courtesy amount confidence score is less than a sixth threshold for the remittance courtesy amount confidence score; and determine when the payment instrument final amount does not equal the remittance courtesy amount and determine the remittance courtesy confidence score and:

route the plurality of payments for verification when the remittance courtesy confidence score is greater than or equal to a seventh threshold for the remittance courtesy amount confidence score;

when the remittance courtesy confidence score is less than an eighth threshold for the remittance courtesy amount confidence score determine if there is a three way match between the payment instrument final amount and at least two of the remittance full payment amount, the remittance minimum payment amount, or the remittance last payment;

if there is a three-way match, route the plurality of payments for posting;

if there is not a three-way match, determine if the payment instrument final amount equals the remittance full payment amount, the remittance minimum payment amount, or the remittance last payment; and if the payment instrument final amount equals the remittance full payment amount:

route the plurality of payments for verification when the payment instrument final amount confidence score is less than a ninth threshold for the payment instrument final amount confidence score; and route the plurality of payments for posting when the payment instrument final amount confidence score is greater than or equal to a tenth threshold for the payment instrument final amount confidence score;

if the payment instrument final amount equals the remittance minimum payment amount:

route the plurality of payments for posting when the payment instrument final amount confidence score is greater than or equal to an eleventh threshold for the payment instrument final amount confidence score;

route the plurality of payments for verification when the payment instrument final amount confidence score is less than a twelfth threshold for the payment instrument final amount confidence score; and if the payment instrument final amount equals the remittance last payment:

route the plurality of payments for posting when the payment instrument final amount confidence score is greater than or equal to a thirteenth threshold for the payment instrument final amount confidence score; and route the plurality of payments for verification when the payment instrument final amount confidence score is less than a fourteenth threshold for the payment instrument final amount confidence score;

determine a tradeoff between a decrease in payment automatic postings vs. an increase in payments routed for verification while reducing the incorrect payment postings by altering: i) at least one of the payment instrument final confidence score first, second, or ninth through fourteenth thresholds, and ii) at least one of the remittance courtesy score third through eighth thresholds, wherein the threshold altering is based on trials using prior collected payment instrument and remittance data.

2. The system of claim 1, wherein the payment instrument final amount is determined from a courtesy box amount and a legal line amount on the payment instrument.

3. The system of claim 1, wherein the altering of the first threshold results in a range from 50% to 95% and the altering of the second threshold results in a range from 30% to 90%.

4. The system of claim 1, wherein the altering of the third threshold results in a range from 10% to 60% and the altering of the fourth threshold results in a range from 10% to 60%.

5. The system of claim 1, wherein the altering of the fifth threshold results in a range from 30% to 90% and the altering of the sixth threshold results in a range from 30% to 90%.

6. The system of claim 1, wherein the altering of the seventh threshold results in a range from 50% to 95% and the altering of the eighth threshold results in a range from 50% to 95%.

7. The system of claim 1, wherein the altering of the ninth threshold results in a range from 10% to 70% and the altering of the tenth threshold results in a range from 10% to 70%.

8. The system of claim 1, wherein the altering of the eleventh threshold results in a range from 30% to 90% and the altering of the twelfth threshold results in a range from 30% to 90%.

9. The system of claim 1, wherein the altering of the thirteenth threshold results in a range from 30% to 90% and the altering of the fourteenth threshold results in a range from 30% to 90%.

10. A computer program product for providing validation and processing of a plurality of payments using a plurality of payment instruments and a plurality of remittance documents, the computer program product comprising at least one non-transitory computer-readable medium having computer-readable program code portions embodied therein, the computer-readable program code portions comprising:

an executable portion configured for receiving a plurality of payment instrument images, wherein the plurality of payment instrument images are captured from the plurality of payment instruments by a payment instrument reader;

an executable portion configured for identifying a payment instrument final amount for each of the plurality of payment instruments from each of the plurality of payment instruments images of each of the plurality of payment instruments;

an executable portion configured for receiving a plurality of remittance document images, wherein the plurality of remittance document images are captured from each of the plurality of remittance documents associated with each of the plurality of payment instruments by a remittance document reader;

an executable portion configured for accessing account information associated with each of the plurality of remittance documents by accessing financial institution systems;

an executable portion configured for identifying a remittance courtesy amount, a remittance full payment amount, a remittance minimum payment amount, and a remittance last payment amount for each of the plurality of remittance documents, wherein the remittance courtesy amount is identified form a remittance document image and the remittance full payment amount, the remittance minimum payment amount, and the remittance last payment amount are identified from either the remittance document image or the account information stored on the financial institution systems;

an executable portion configured for determining when the payment instrument final amount equals the remittance courtesy amount and determining a payment instrument final amount confidence score and:
  routing the plurality of payments for verification when the payment instrument final amount confidence score is less than a first threshold for the payment instrument final amount confidence score;
  when the payment instrument final amount confidence score is greater than or equal to a second threshold for the payment instrument final amount confidence score determine a remittance courtesy amount confidence score and:
    routing the plurality of payments for verification when the remittance courtesy amount confidence score is less than a third threshold for the remittance courtesy amount confidence score; and
    routing the plurality of payments for posting when the remittance courtesy amount confidence score is greater than a fourth threshold for the remittance courtesy amount confidence score; and
  when the payment instrument final amount confidence score is greater than or equal to the first threshold but less than the second threshold for the payment instrument final amount confidence score:
    routing the plurality of payments for posting when the remittance courtesy amount confidence score is greater than or equal to a fifth threshold for the remittance courtesy amount confidence score; and
    routing the plurality of payments for verification when the remittance courtesy amount confidence score is less than a sixth threshold for the remittance courtesy amount confidence score; and
determining when the payment instrument final amount does not equal the remittance courtesy amount and determining the remittance courtesy confidence score and:
  routing the plurality of payments for verification when the remittance courtesy confidence score is greater than or equal to a seventh threshold for the remittance courtesy amount confidence score;
  when the remittance courtesy confidence score is less than an eighth threshold for the remittance courtesy amount confidence score determining if there is a three way match between the payment instrument final amount and at least two of the remittance full payment amount, the remittance minimum payment amount, or the remittance last payment;
  if there is a three-way match, routing the plurality of payments for posting;
  if there is not a three-way match, determining if the payment instrument final amount equals the remittance full payment amount, the remittance minimum payment amount, or the remittance last payment; and
    if the payment instrument final amount equals the remittance full payment amount:
      routing the plurality of payments for verification when the payment instrument final amount confidence score is less than a ninth threshold for the payment instrument final amount confidence score; and
      routing the plurality of payments for posting when the payment instrument final amount confidence score is greater than or equal to a tenth threshold for the payment instrument final amount confidence score;
    if the payment instrument final amount equals the remittance minimum payment amount:
      routing the plurality of payments for posting when the payment instrument final amount confidence score is greater than or equal to an eleventh threshold for the payment instrument final amount confidence score;
      routing the plurality of payments for verification when the payment instrument final amount confidence score is less than a twelfth threshold for the payment instrument final amount confidence score; and
    if the payment instrument final amount equals the remittance last payment:
      routing the plurality of payments for posting when the payment instrument final amount confidence score is greater than or equal to a thirteenth threshold for the payment instrument final amount confidence score; and
      routing the plurality of payments for verification when the payment instrument final amount confidence score is less than a fourteenth threshold for the payment instrument final amount confidence score;
determining a tradeoff between a decrease in payment automatic postings vs. an increase in payments routed for verification while reducing the incorrect payment postings by altering: i) at least one of the payment instrument final confidence score first, second, or ninth through fourteenth thresholds, and ii) at least one of the remittance courtesy score third through eighth thresholds, wherein the threshold altering is based on trials using prior collected payment instrument and remittance data.

11. The computer program product of claim 10, wherein the payment instrument final amount is determined from a courtesy box amount and a legal line amount on the payment instrument.

12. The computer program product of claim 10, wherein the altering of the first threshold results in a range from 50% to 95% and the altering of the second threshold results in a range from 30% to 90%.

13. The computer program product of claim 10, wherein the altering of the third threshold results in a range from 10% to 60% and the altering of the fourth threshold results in a range from 10% to 60%.

14. The computer program product of claim 10, wherein the altering of the fifth threshold results in a range from 30% to 90% and the altering of the sixth threshold results in a range from 30% to 90%.

15. The computer program product of claim 10, wherein the altering of the seventh threshold results in a range from 50% to 95% and the altering of the eighth threshold results in a range from 50% to 95%.

16. The computer program product of claim 10, wherein the altering of the ninth threshold results in a range from 10% to 70% and the altering of the tenth threshold results in a range from 10% to 70%.

17. The computer program product of claim 10, wherein the altering of the eleventh threshold results in a range from 30% to 90% and the altering of the twelfth threshold results in a range from 30% to 90%.

18. The computer program product of claim 10, wherein the altering of the thirteenth threshold results in a range from 30% to 90% and the altering of the fourteenth threshold results in a range from 30% to 90%.

19. A method for providing validation and processing of a plurality of payments using a plurality of payment instruments and a plurality of remittance documents, the method comprising:

receiving, by one or more processing devices, a plurality of payment instrument images, wherein the plurality of payment instrument images are captured from the plurality of payment instruments by a payment instrument reader;

identifying, by the one or more processing devices, a payment instrument final amount for each of the plurality of payment instruments from each of the plurality of payment instruments images of each of the plurality of payment instruments;

receiving, by the one or more processing devices, a plurality of remittance document images, wherein the plurality of remittance document images are captured from each of the plurality of remittance documents associated with each of the plurality of payment instruments;

accessing, by the one or more processing devices, account information associated with each of the plurality of remittance documents by accessing financial institution systems;

identifying, by the one or more processing devices, a remittance courtesy amount, a remittance full payment amount, a remittance minimum payment amount, and a remittance last payment amount for each of the plurality of remittance documents, wherein the remittance courtesy amount is identified from a remittance document image and the remittance full payment amount, the remittance minimum payment amount, and the remittance last payment amount are identified from either the remittance document image or the account information stored on the financial institution systems;

determining, by the one or more processing devices, when the payment instrument final amount equals the remittance courtesy amount and determining a payment instrument final amount confidence score and:

routing the plurality of payments for verification when the payment instrument final amount confidence score is less than a first threshold for the payment instrument final amount confidence score;

when the payment instrument final amount confidence score is greater than or equal to a second threshold for the payment instrument final amount confidence score determine a remittance courtesy amount confidence score and:

routing the plurality of payments for verification when the remittance courtesy amount confidence score is less than a third threshold for the remittance courtesy amount confidence score; and routing the plurality of payments for posting when the remittance courtesy amount confidence score is greater than a fourth threshold for the remittance courtesy amount confidence score; and when the payment instrument final amount confidence score is greater than or equal to the first threshold but less than the second threshold for the payment instrument final amount confidence score:

routing the plurality of payments for posting when the remittance courtesy amount confidence score is greater than or equal to a fifth threshold for the remittance courtesy amount confidence score; and routing the plurality of payments for verification when the remittance courtesy amount confidence score is less than a sixth threshold for the remittance courtesy amount confidence score; and determining when the payment instrument final amount does not equal the remittance courtesy amount and determining the remittance courtesy confidence score and:

routing the plurality of payments for verification when the remittance courtesy confidence score is greater than or equal to a seventh threshold for the remittance courtesy amount confidence score;

when the remittance courtesy confidence score is less than an eighth threshold for the remittance courtesy amount confidence score determining if there is a three way match between the payment instrument final amount and at least two of the remittance full payment amount, the remittance minimum payment amount, or the remittance last payment;

if there is a three-way match, routing the plurality of payments for posting;

if there is not a three-way match, determining if the payment instrument final amount equals the remittance full payment amount, the remittance minimum payment amount, or the remittance last payment; and if the payment instrument final amount equals the remittance full payment amount:

routing the plurality of payments for verification when the payment instrument final amount confidence score is less than a ninth threshold for the payment instrument final amount confidence score; and routing the plurality of payments for posting when the payment instrument final amount confidence score is greater than or equal to a tenth threshold for the payment instrument final amount confidence score;

if the payment instrument final amount equals the remittance minimum payment amount:

routing the plurality of payments for posting when the payment instrument final amount confidence score is greater than or equal to an eleventh threshold for the payment instrument final amount confidence score;

routing the plurality of payments for verification when the payment instrument final amount confidence score is less than a twelfth threshold for the payment instrument final amount confidence score; and if the payment instrument final amount equals the remittance last payment:

routing the plurality of payments for posting when the payment instrument final amount confidence score is greater than or equal to a thirteenth threshold for the payment instrument final amount confidence score; and routing the plurality of payments for verification when the payment instrument final amount confidence score is less than a fourteenth threshold for the payment instrument final amount confidence score;

determining a tradeoff between a decrease in payment automatic postings vs. an increase in payments routed for verification while reducing the incorrect payment postings by altering: i) at least one of the payment instrument final confidence score first, second, or ninth through fourteenth thresholds, and ii) at least one of the remittance courtesy score third through eighth thresholds, wherein the threshold altering is based on trials using prior collected payment instrument and remittance data.

20. The method of claim 19, wherein the payment instrument final amount is determined from a courtesy box amount and a legal line amount on the payment instrument.

\* \* \* \* \*